US010675897B2

(12) United States Patent
Wang et al.

(10) Patent No.: US 10,675,897 B2
(45) Date of Patent: Jun. 9, 2020

(54) APPARATUS FOR FLEXIBLE FLAT CABLE

(71) Applicant: Hewlett-Packard Development Company, L.P., Houston, TX (US)

(72) Inventors: Deyang Wang, Singapore (SG); Clint Carl Sensano, Singapore (SG); Yan Zhu, Singapore (SG); Chin Siang Chua, Singapore (SG); Chern Fong Chong, Singapore (SG)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/224,081

(22) Filed: Dec. 18, 2018

(65) Prior Publication Data

US 2019/0118564 A1 Apr. 25, 2019

Related U.S. Application Data

(62) Division of application No. 15/336,030, filed on Oct. 27, 2016, now Pat. No. 10,195,878.

(51) Int. Cl.
| | | |
|---|---|---|
| *H01R 12/77* | (2011.01) | |
| *B41J 29/02* | (2006.01) | |
| *H02G 11/00* | (2006.01) | |
| *B41J 19/00* | (2006.01) | |
| *H01R 12/59* | (2011.01) | |
| *H01R 12/79* | (2011.01) | |
| *B41J 29/393* | (2006.01) | |

(52) U.S. Cl.
CPC ............. *B41J 29/02* (2013.01); *B41J 19/005* (2013.01); *B41J 29/393* (2013.01); *H01R 12/59* (2013.01); *H01R 12/77* (2013.01); *H01R 12/79* (2013.01); *H02G 11/00* (2013.01)

(58) Field of Classification Search
CPC ........ H01R 12/79; H01R 12/59; H01R 12/77; H02G 11/00; B41J 19/005
See application file for complete search history.

(56) References Cited

U.S. PATENT DOCUMENTS

| | | |
|---|---|---|
| 7,909,441 B2 | 3/2011 | Samoto et al. |
| 7,954,932 B2 | 6/2011 | Kawamura et al. |
| 9,102,166 B2 | 8/2015 | Numata |
| 9,332,143 B2 | 5/2016 | Tamai |
| 2004/0056926 A1* | 3/2004 | Samoto .................... B41J 29/02 347/50 |
| 2009/0167825 A1 | 7/2009 | Kawamura |
| 2013/0088537 A1 | 4/2013 | Yazawa |

FOREIGN PATENT DOCUMENTS

| | | |
|---|---|---|
| JP | 2012171332 A | 9/2012 |
| JP | 2012179819 A | 9/2012 |

* cited by examiner

*Primary Examiner* — Sharon A. Polk
(74) *Attorney, Agent, or Firm* — HP Inc. Patent Department

(57) ABSTRACT

Examples of an apparatus for flexible flat cable, installable within a print device, are described. The flexible flat cable may be connected to a print carriage assembly of the print device.

13 Claims, 6 Drawing Sheets

APPARATUS FOR FLEXIBLE FLAT CABLE

BACKGROUND

Inkjet based print devices generally include a print carriage assembly. For printing, print carriage assembly moves relative to the surface of a print medium. The operation of the print carriage assembly is controlled and managed by a main circuit board within the print device. Generally, the main circuit board is communicatively coupled to the print carriage assembly through a flexible flat cable. The flexible flat cable also moves owing to the movement of the print carriage assembly and may be retained using various mechanisms to ensure that the flexible flat cable does not interfere with other components of the print device while it operates.

BRIEF DESCRIPTION OF THE DRAWINGS

The following detailed description references the drawings, wherein.

DETAILED DESCRIPTION

Figure 1:
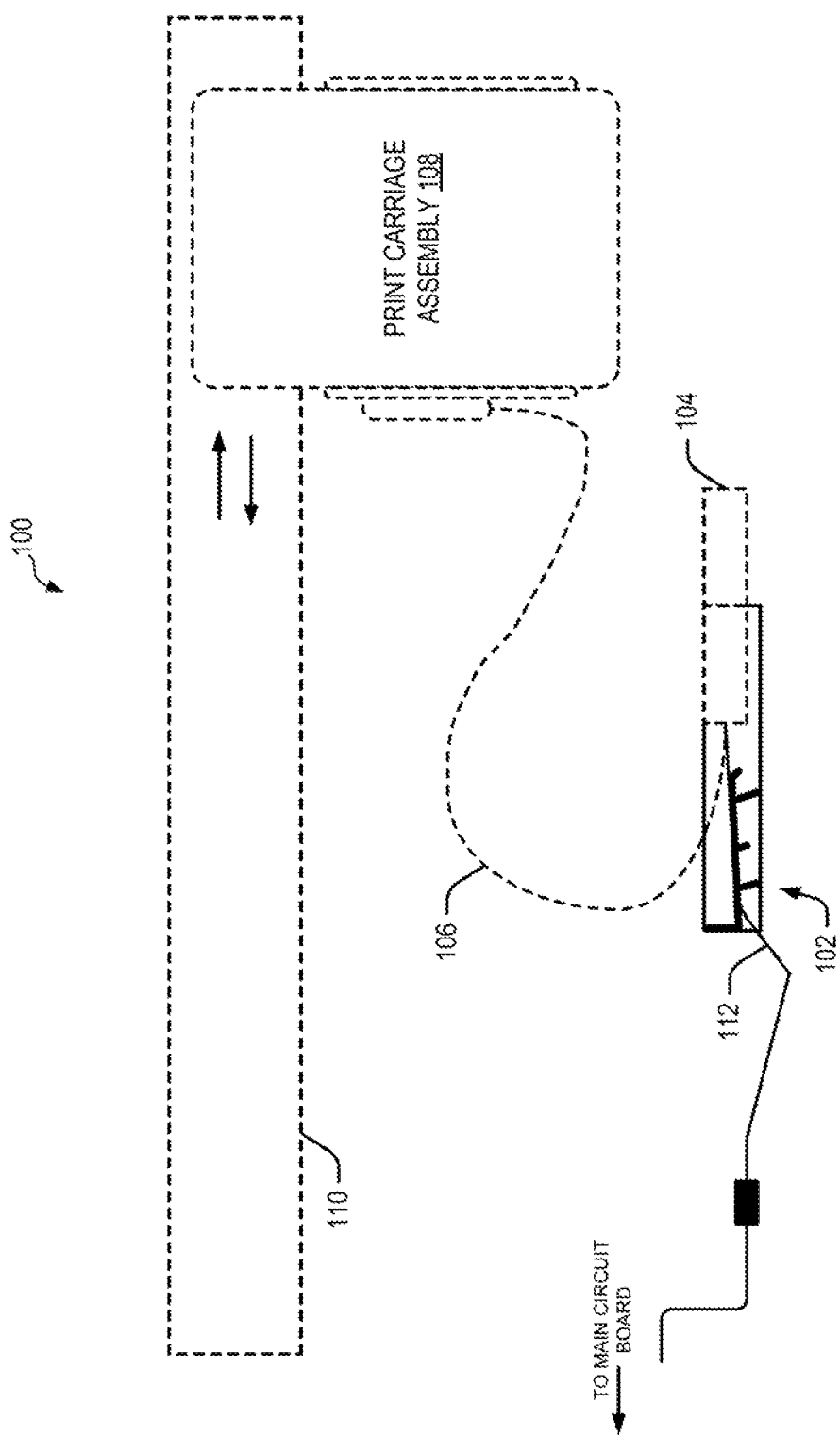
FIG. 1 is a diagram of an example cable guiding apparatus for a flexible flat cable.

In print devices, generally a print carriage assembly may include multiple print heads. For printing, the print carriage assembly moves horizontally in a to-fro motion relative to the surface of a print medium. Characters may be printed by selectively activating print heads as the print carriage assembly moves across the surface of the print medium. When activated, the print heads may discharge a specific volume of ink to print the desired characters.

The operation of the print carriage assembly is controlled and managed by a main circuit board of the print device. Generally, the main circuit board is communicatively coupled to the print carriage assembly through a flexible flat cable. The flexible flat cable may be used for transmitting power, data signals or control signals from the main circuit board to the print carriage assembly. The flexible flat cable may be considered as composed of multiple electrically conducting wires extending in a parallel manner along a flat plane. The conducting wires may be bound using electrically non-conducting material. The non-conducting material, amongst other aspects, may provide a certain degree of flexibility to the flexible flat cable for bending and at the same time may provide protection against fatigue caused due to operation, oxidation, and environment contamination.

Of two ends of the flexible flat cable, one end is connected to the print carriage assembly. The other end is indirectly connected to the main circuit board through a retaining apparatus. With one end of the retaining apparatus connected to the other end of the flexible flat cable, the other end of the retaining apparatus may be connected to the main circuit board through interconnects or other interfaces.

Generally, the retaining apparatus may retain a portion of the flexible flat cable which is connected to it. As explained previously, the flexible flat cable also moves owing to the motion of the print carriage assembly. The retaining apparatus retains a portion of the flexible flat cable to prevent any damage or loosening of the joint at which the flexible flat cable is connected to the retaining apparatus. The retaining apparatus may be so oriented such that the flexible flat cable remains twist free, along its length between the retaining apparatus and the print carriage assembly. The flexible flat cable may generally form a curved loop when connected between the retaining apparatus and the print carriage assembly.

During operation, with the movement of the print carriage assembly the flexible flat cable may intermittently extend or bend with respect to the retainer. When it is extended, the flexible flat cable may settle on a flat surface of a cable guiding apparatus. The flat surface generally extends in parallel to an axis along which the print carriage assembly moves. While bending in the form of a curved loop, the flexible flat cable may be subjected to stresses. Furthermore, design changes to achieve a more compact print device have resulted in the guiding apparatus being moved closer to the print carriage assembly. This has further increased the stress to which the flexible flat cable may be subjected to. The stresses experienced by the flexible flat cable may in turn also affect the movement of the print carriage assembly. For example, the stresses may cause reaction forces onto the print carriage assembly resulting in unstable motion owing to which print quality defects may arise. Furthermore, owing to the increased stresses, the operational life of the flexible flat cable may also reduce. The onset of such effects may be reduced by decreasing the printing speeds. Reducing printing speeds is however not implemented as an option for resolving the aforementioned issue.

The flexible flat cable may either extend above the plane in which the print carriage assembly moves or may also extend in the same plane. In certain cases, wherein the flat surface of the flexible flat cable is orthogonal to the horizontal plane in which print carriage assembly moves, the flexible flat cable may sag under its own weight over a period of time. The sagging may result in the flexible flat cable interfering with other internal components, as the print carriage assembly moves. This may result in decrease the life of the flexible flat cable which in turn may require periodic replacement and repair.

Examples of apparatus for flexible flat cable utilized in print devices are described. In one example, a cable guiding apparatus for a flexible flat cable is described. The guiding apparatus is used for accommodating the flexible flat cable. When accommodated, the flexible flat cable rests onto the guiding apparatus when the flexible flat cable is extended. In the present example, the guiding apparatus includes a cable accommodating portion. The cable accommodating portion has a prescribed width to accommodate the width of the flexible flat cable. The cable guiding apparatus is such that the cable accommodating portion extends away from the axis along which the print carriage assembly moves. The cable accommodating portion may be linear or curved. Owing to such a configuration of the cable accommodating portion, the bending stresses that are produced onto the flexible flat cable are less. This further reduces the reaction forces that may act on the print carriage assembly, thereby maintaining print quality.

The degree to which the cable accommodating portion may extend away from the print carriage assembly may depend on a variety of factors, such as stiffness of the cable free length of the cable, speed of the print carriage assembly, gaps between the print carriage assembly and the flexible flat cable. It should be noted that these are just illustrative and other examples may also be present without deviating from the scope of the present subject matter. Furthermore, it should also be noted that any reference to the cable accommodating portion extending away from the print carriage assembly would imply the cable accommodating portion extending away from the axis along which the print carriage assembly moves In another example, there may be a case where the surface of the flexible flat cable is orthogonal to the horizontal plane in which print carriage assembly moves. To this end, a retaining apparatus for the flexible flat cable is described. The retaining apparatus retains a portion of the flexible flat cable. From the retaining apparatus, the flexible flat cable extends out and may be further connected to the print carriage assembly. In one example, the retaining apparatus is so adapted such that the flexible flat cable when extending from the retaining apparatus is at a specific angle in an upward direction with respect to the horizontal plane along which the print carriage assembly moves. To this end, in one example, the retaining apparatus may be tilted by the specific angle with respect to the horizontal plane to cause the flexible flat cable to extend from the apparatus and slightly lift it in the upward direction with respect to the horizontal plane. As would be understood, the flexible flat cable being slight lifted above may counter any effect that may arise due to the sagging of the flexible flat cable over a course of time. In this manner, the operational life of the flexible flat cable is enhanced. The specific angle by which the retaining apparatus is titled may be based on numerous factors such as free length of the flexible flat cable, coating material of the flexible flat cable, and weight and width of the flexible flat cable. Other examples may be also included without deviating from the scope of the present subject matter.

These and other aspects are described in conjunction with various examples as illustrated in FIGS. 1-6. The present description is provided for print devices which may have a print carriage assembly. However, the scope of the present subject matter may not be limited to only such print devices. Other print devices may also be included within the scope of the present subject matter without any limitation. Furthermore, in some figures, various components for which no protection is sought have been illustrated using dotted lines.

FIG. 1 illustrates an example cable guiding apparatus 102 implemented within a print device 100 having one or more components. FIG. 1 depicts such a print device as a block diagram of various components of such a print device 100. The block diagram illustrates logical blocks representing functional or mechanical entities which may be present in the print device 100. The block diagram does not indicate any specific arrangement of such elements nor does it represent the manner in which such elements may be interconnected with each other. Any arrangement or rearrangement of blocks may be implemented without deviating from the scope of the present subject matter.

In the present example, the print device 100 includes a cable guiding apparatus 102 (hereinafter referred to guiding apparatus 102). The guiding apparatus 102 may be connected to a retaining apparatus 104. The retaining apparatus 104 may be considered as providing a support for the guiding apparatus 102 and also for retaining a portion of the flexible flat cable 106 (referred to as the cable 106). The other end of the cable 106 is connected to a print carriage assembly 108. The print carriage assembly 108 in operation may move in a to and fro motion along a drive mechanism 110. The drive mechanism 110 enables the movement of the print carriage assembly 204 along the directions as indicated. As explained briefly, the movement of the print carriage assembly 108 affects the printing of desired characters based on one or more executable commands.

The guiding apparatus 102 may further include interfaces for connecting the cable 106 to the main circuit board (not shown in FIG. 1) of the print device 100. The cable 106 in connection with the guiding apparatus 102 and the retaining apparatus 104 provide an electronic communication channel between the main circuit board and the print carriage assembly 108. The cable 106 may be used for transmitting power, communicating data and control signals from the main circuit to the print carriage assembly 108.

Returning to the guiding apparatus 102, the guiding apparatus 102 may further include a cable accommodating portion 112 (referred to as the portion 112). The portion 112 has two ends, one of which is connected to the cable 106. The portion 112 may be in the shape of a strip and is of specific width. The specific width of the portion 112 may be so selected based on the width of the cable 106. As also explained previously, the print carriage assembly 108 moves in a to-fro motion across two extreme positions. As the print carriage assembly 108 moves, the cable 106 may be bent or relaxed depending on the position of the print carriage assembly 108. For example, as the print carriage assembly 108 moves from right to left (as shown in FIG. 1), the cable 106 would be bent in a loop. As the print carriage assembly 108 continues to move, the cable 106 would be accommodated over the guiding apparatus 102.

Returning to the features of the guiding apparatus 102, the portion 112 accommodates the cable 106 as the print carriage assembly 108 moves from the right to the left direction. The portion 112 extends away from an imaginary axis along which the print carriage assembly 108 moves. It should be noted that in the present description any reference to the guiding apparatus extending away from the print carriage assembly refers to the guiding apparatus 102 extending away from an axis along which the print carriage assembly moves. The portion 112 may in turn be composed of individual linear portions which may be continuously joined together to form the guiding apparatus 102 such that the portion 112 extends away from the print carriage assembly 108. In another example, the guiding apparatus 102 may be curved and therefore may gradually extend away from the print carriage assembly 108. In one example, the slope of the guiding apparatus 102 is in a range of about 5° to 10°.

The guiding apparatus 102 which extends away from the print carriage assembly 108 results in lesser bending stresses when the cable 106 settles over the portion 112. The reduced bending stresses further reduces the reaction forces that may act on the print carriage assembly 108 thereby improving and maintaining print quality. Furthermore, since the bending stresses on the cable 106 are alleviated to an extent, the operational life of the cable 106 also increases. These and other aspects are further described in conjunction with other figures as well.

Figure 2:
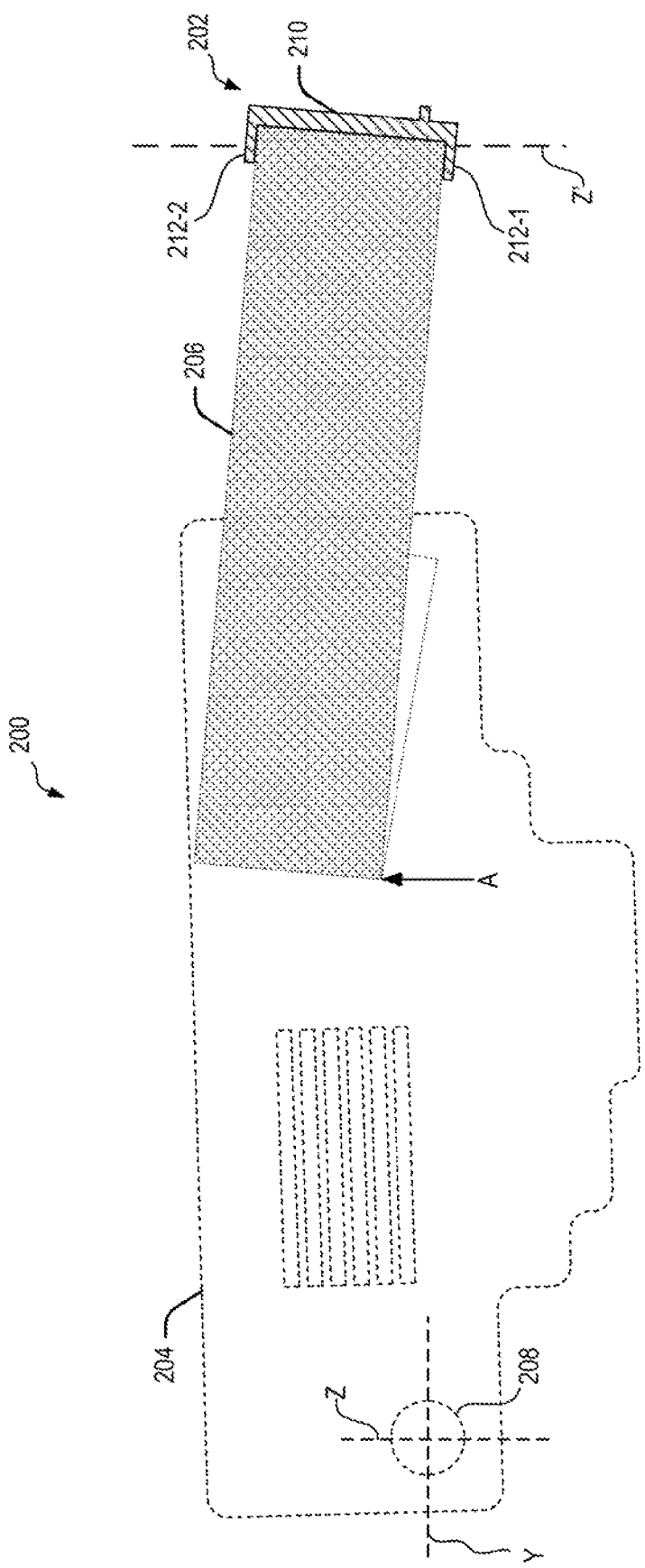
FIG. 2 is a diagram depicting an example apparatus for retaining a flexible flat cable.

FIG. 2 depicts an example retaining apparatus 202 implemented within a print device 200. The print device 200 further includes a print carriage assembly 204. The print carriage assembly 204 may include various circuitry and components that when operated enable the printing of matter over a print medium. A flexible flat cable 206 extends from the retaining apparatus 202 and is connected to the print carriage assembly 204. The print carriage assembly 204 may move along shaft 208 having the Y and Z axes as depicted. The X-axis extends into the plane in which the aforesaid components are depicted and is orthogonal to the Y and Z axes.

The retaining apparatus 202 may retain a portion of the cable 206 which is connected to it. This is to secure the cable 206, say to the guiding apparatus 102, and therefore to prevent any damage or loosening of the joint at which the cable 206 is connected to the retaining apparatus 202. The retaining apparatus 202 may further include a clamping member 210 for securely retaining the cable 206, for example to the guiding apparatus 102. The retaining apparatus 202 may further include a cavity for accommodating a portion of the cable 206 when it is securely retained by the clamping member 210. The guiding apparatus 202 further includes a set of guiding elements 212-1, 2 for aligning the cable 206 when securely retained by the clamping member 210. In one example, the guiding elements 212-1, 2 may be ribs or channels on either side of the guiding apparatus.

The retaining apparatus 202 may be so oriented such that the cable 206 extends in a loop and remains twist free along its length between the retaining apparatus 202 and the print carriage assembly 204. In the present example, the retaining apparatus 202 lifts the cable 206 in an upward direction A as indicated, as it extends therefrom. As a result of such an elevation, the cable 206 is at a specific angle in an upward direction with respect to horizontal plane (i.e., the X-Y plane). To put it in another way, the loop of the cable 206 extends above the plane in which the points where the cable 206 is attached to the retaining apparatus 202 and where the cable 206 attaches to the print carriage assembly 204, lie.

The adaptation of the retaining apparatus 202 may be affected through a variety of ways. In one example, the retaining apparatus 202 may be such that it is inclined at a specific angle with respect to a vertical axis (represented as Z' axis) running in parallel with the Z-axis. The specific angle at which the retaining apparatus 202 is inclined may be based on a number of parameters pertaining to the attributes of the cable 206. Examples of such attributes include but are not limited to free length of the flexible flat cable, coating material of the flexible flat cable, and weight and width of the flexible flat cable. In another example, the cavity of the retaining apparatus 202 may be such that the cable 206 when extending out of the retaining apparatus 202, is lifted in an upward direction A as indicated. Other adaptations for the retaining apparatus 202 which result in lifting of the cable 206 in an upward direction A as indicated, would also be included within the scope of the present subject matter as claimed.

Figure 3:
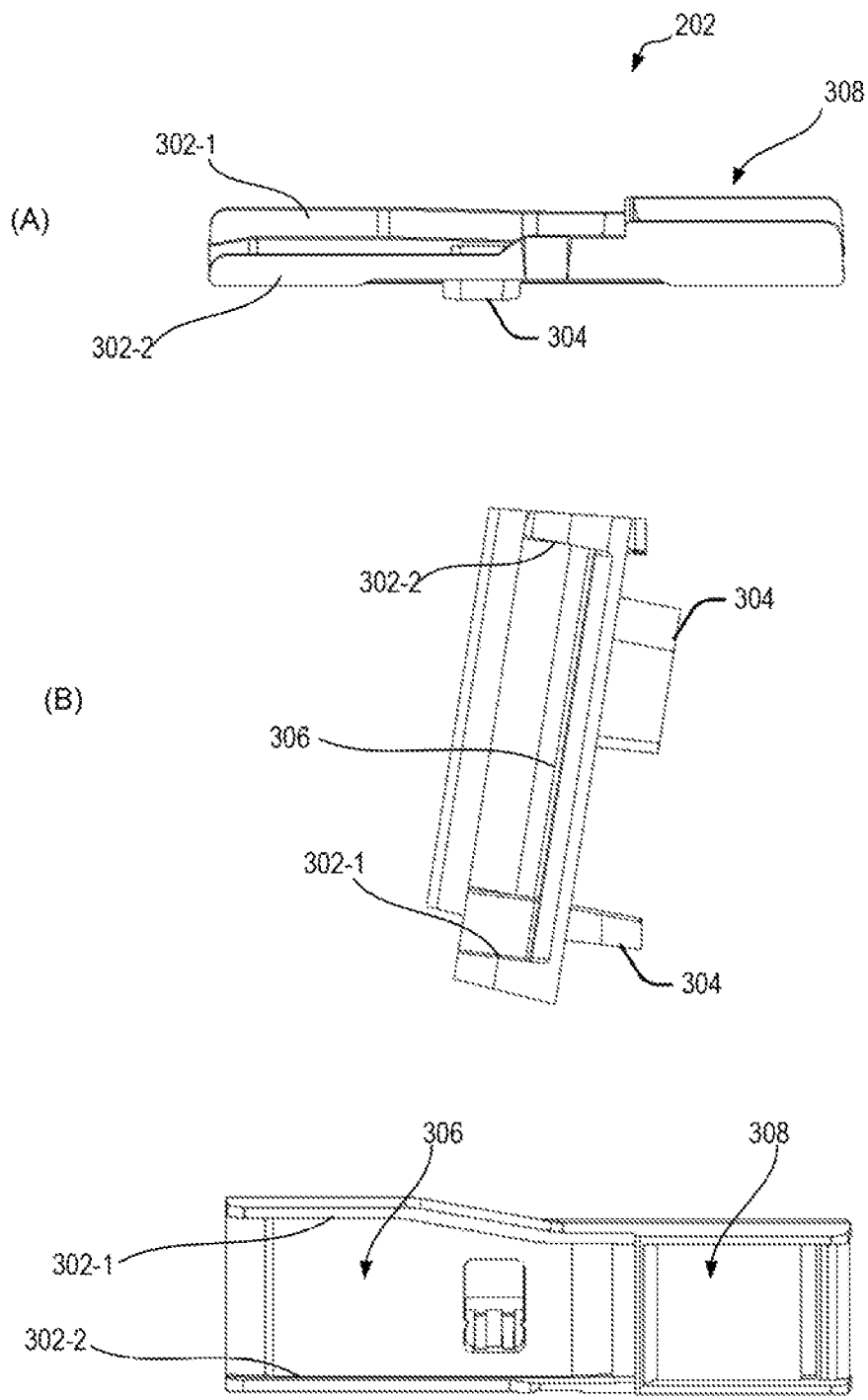
FIG. 3 is diagram depicting various components of an example apparatus for retaining a flexible flat cable.

FIG. 3 depicts various features of an example retaining apparatus, such as the retaining apparatus 202. FIG. 3 provides various views in FIGS. 3(A)-(C) of the retaining apparatus 202. For example, FIG. 3(A) provides the view of the retaining apparatus 202 from the upwards Z-direction. FIGS. 3(B)-(C) provide the views of the retaining apparatus 202 from the X and Z directions, respectively. As depicted in the present drawings, the retaining apparatus 202 includes a set of guiding elements 302-1,2, mounting elements 304, surface 306 and static retaining portion 308. The guiding elements 302-1,2 provide a set of channels or ribs to ensure that a flexible flat cable, such as the cable 206 is accommodated within the guiding elements 302-1,2. The mounting elements 304 in turn provide mechanism for mounting the retaining apparatus 202 onto a print device, such as the print device 200. The mounting elements 304 may be implemented as hooks or clamps, or any other mechanism for fixing the retaining apparatus 202 with the print device 200. It should be noted that the present figure depicts only a pair of mounting elements 304. The number of mounting elements 304 may vary depending on the type or size of the print device 200 without limiting the scope of the scope of the present subject matter.

Continuing with the features of the retaining apparatus 202, the surface 306 is the area from the which the cable 206 extends therefrom. As mentioned previously, the retaining apparatus 202 may be so adapted such that the cable 206 when extending from the retaining apparatus 202 is lifted in an upward direction A as indicated. As a result of such an elevation, the cable 206 is at a specific angle in an upward direction with respect to horizontal plane (i.e., the X-Y plane). In one example, the surface 306 may be inclined at the specific angle with respect to horizontal plane so that the cable when extending from the retaining apparatus 202 is lifted upwards as well. In one example, the specific angle may be in the range of about 5° to 15°. In another example, the retaining apparatus 202 may be installed such that it is inclined with the vertical plane at about the specific angle as well. The retaining apparatus 202 may also include a static retaining portion 308. The static retaining portion 308 secures the cable 206 to the retaining apparatus 202 to prevent any damage or loosening of the joint at which the cable 206 is connected to the retaining apparatus 202. In one example, the cable 206 may be secured at the static retaining portion using a clamp 210. It should be noted that the present features are only examples and should not be construed as limiting the scope of the present subject matter.

Figure 4:
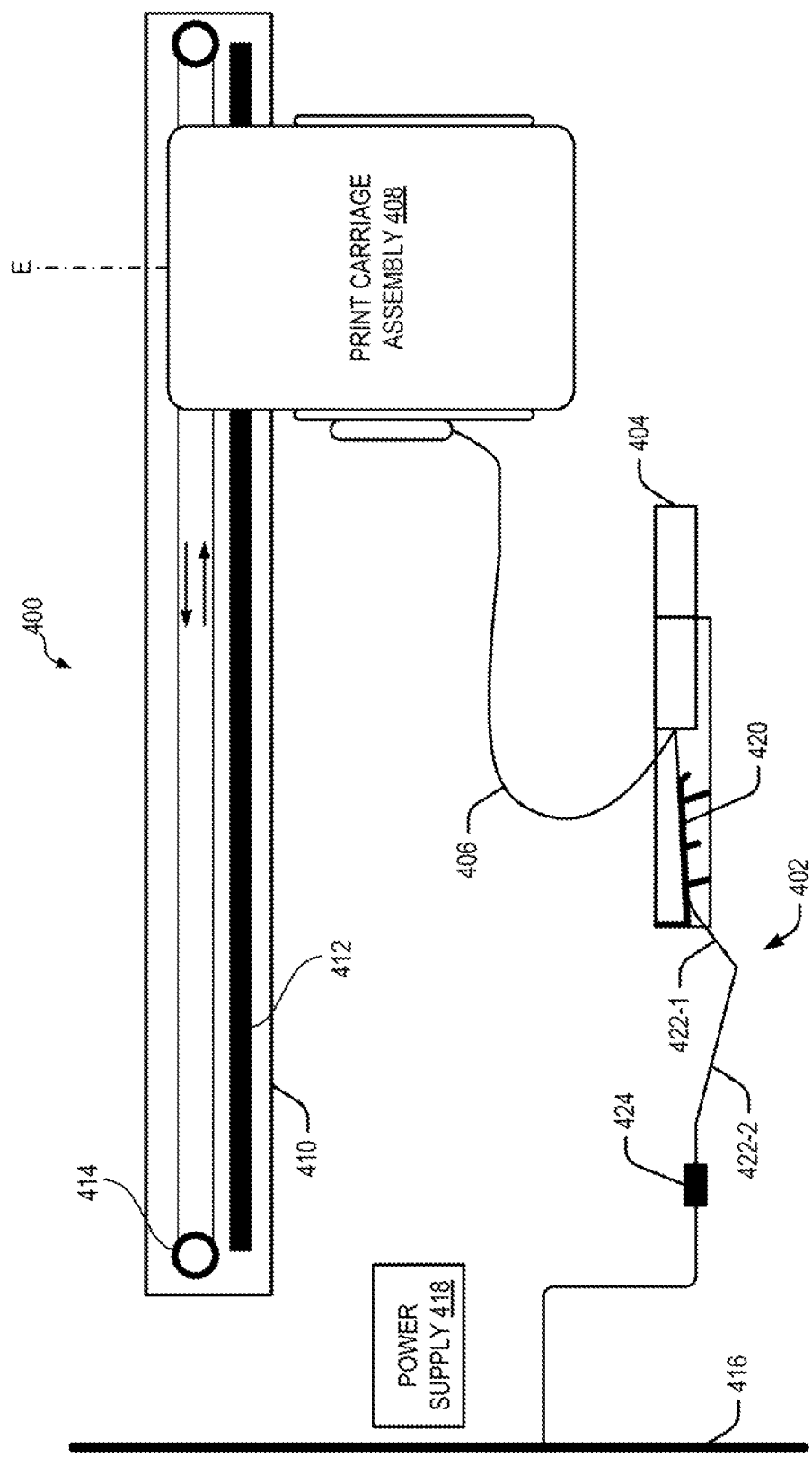
FIGS. 4 and 5 depict various components in different stages of operation of a print device having an example cable guiding apparatus for a flexible flat cable.
Figure 5:
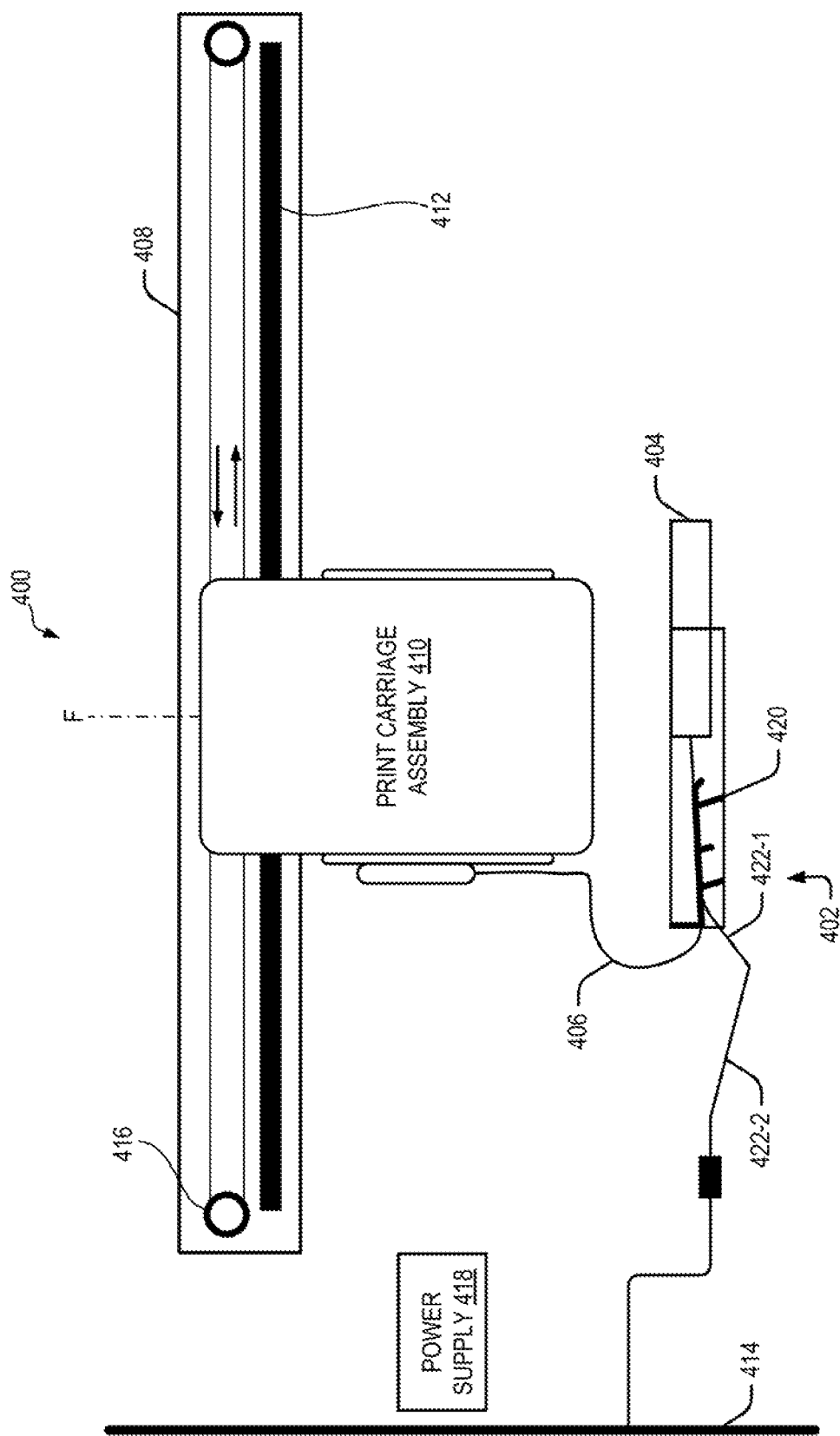

FIGS. 4 and 5 depict various components and stages of operation of a print device 400. The print device 400 may be any device which can be used for printing characters by ejecting specific volumes of ink onto a print medium. The print device 400 includes a guiding apparatus 402 connected to a retaining apparatus 404. One end of a flexible flat cable 406 is connected to the retaining apparatus 404 and the other end of the cable 406 is connected to a print carriage assembly 408. The print carriage assembly 408 moves to and fro in the directions as indicated. In the present example, the motion of the print carriage assembly 408 is driven by the drive mechanism 410. The drive mechanism 410 may further include one or more guide rails 412. The guide rails 412 provide a guided path for the motion of the print carriage assembly 408 as it moves between two extreme ends of the guide rails 412. The drive mechanism 410 may further include a conveyor mechanism 416 to control and affect the motion of the print carriage assembly 408.

The guiding apparatus 402 may further be composed of multiple portions, for example the cable accommodating portion 420. The cable accommodating portion 420 (referred to as the portion 420) has two ends, one of which is connected to the cable 406. The portion 420 may be in the shape of a strip and is of specific width. The specific width of the portion 420 may be selected based on the width of the cable 406. As the print carriage assembly 408 moves, the cable 406 may be bent in a loop or partly settled onto the portion 420 depending on whether the print carriage assembly 408 is in position E or position F, respectively. The portion 420 extends away from the print carriage assembly 408. The portion 420 may be further connected to an extended portion 422-1. The extended portion 422-1 may further extend away from the print carriage assembly as is shown in FIGS. 4-5. A subsequent portion 422-2 is further connected to the extended portion 422-1. The subsequent portion 422-2 is oriented with respect to the extended portion 422-1 with that the extended portion 422-1 and the subsequent portion 422-2 provide an inward surface for accommodating the cable 406. In another example, the portion 420 and the extended portion 422-1 may be profiled to form a curve.

Referring again to the print device 400, the guiding apparatus 402 may further be communicatively coupled to a main circuit board 416 and a power supply 418 via interface 322. The interface 322 may include a variety of interfaces, for example, interfaces for data communication to standardized connections for communicatively coupling various components of the print device 400. The main circuit board 416 may include any predefined logic as software or programmed hardware or logical circuitry, for controlling the movement of the print carriage assembly 408 for printing. The cable 406 transits data signals and control signals between the main circuit board 416 and the print carriage assembly 408.

In operation, one or more control instructions may be generated by the main circuit board 416. Based on the control signals the drive mechanism 410 may be activated to move the print carriage assembly 408 from its position E. When the print carriage assembly 408 is in position E, the cable 406 forms a loop as is indicated in FIG. 4. The loop formed has a larger radius of curvature and hence may experience bending stresses well within its tolerance range. As the printing process continues, the print carriage assembly 408 moves from the initial position E to its next position F as is indicated in FIG. 5. As the print carriage assembly 408 moves towards position F, the cable 406 settles on the portion 420. As the print carriage assembly 408 continues move towards the position F, the cable 406 may proceed and settle onto the extended portion 422-1 and the finally onto the subsequent portion 422-2. As the cable 406 settles and accommodates onto the guiding apparatus 402, the loop formed onto the cable 406 is less owing to the guiding apparatus 402 extending away from the print carriage assembly 408. The process may continue with the intermittent motion of the print carriage assembly 408 in which the cable 406 too bends and settles over the guiding apparatus 402. The approaches as described reduces the bending stresses in the cable 406 and further prolongs the operational life of the cable 406. Furthermore, the reaction forces acting on the print carriage assembly 408 are also reduced thereby maintaining the print quality even at higher print speeds.

Figure 6:
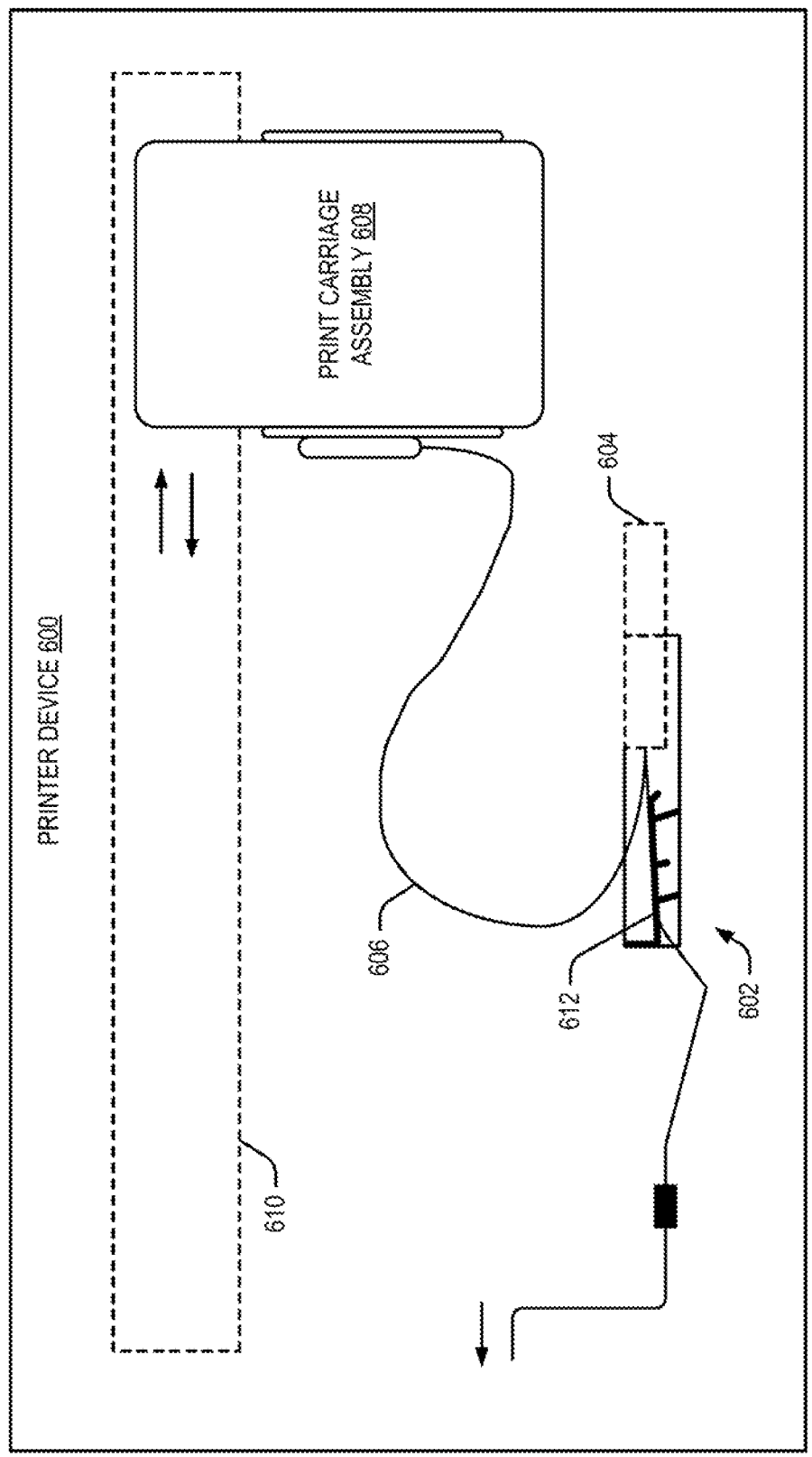
FIG. 6 is a diagram of a print device having a cable guiding apparatus for a flexible flat cable, as per an example of the present subject matter.

FIG. 6 provides various components of a print device 600 as per an example of the present subject matter. The print device 600 includes a guiding apparatus 602 attached to a retaining apparatus 604. The retaining apparatus 604 provides support for the guiding apparatus 602. A flexible flat cable 606 is connected with the retaining apparatus 604. The other end of the cable 606 is connected to the print carriage assembly 608. The print carriage assembly 608 in operation may move in a to and fro motion along the drive mechanism 610. The drive mechanism 610 enables the movement of the print carriage assembly 608 along the directions as indicated. As explained briefly, the movement of the print carriage assembly 608 affects the printing of desired characters based on one or more executable commands.

The guiding apparatus 602 may further include interfaces for connecting to the main circuit board, such as the main circuit board 414. The cable 606 in connection with the guiding apparatus 602 and the retaining apparatus 604 provide an electronic communication channel between the main circuit board and the print carriage assembly 608. The cable 606 may be used for communicating data and control signals from the main circuit to the print carriage assembly 608. As seen in FIG. 6, various components for which no protection is sought have been illustrated using dotted lines.

The guiding apparatus 602 may further include a cable accommodating portion 612 (referred to as the portion 612). The portion 612 has two ends, one of which is connected to the cable 606. The portion 612 may be in the shape of a strip and is of specific width. The specific width of the portion 612 may be so selected based on the width of the cable 606. As also explained previously, the print carriage assembly 608 moves in a to-fro motion across two extreme positions. As the print carriage assembly 608 moves, the cable 606 may be bent or relaxed depending on the position of the print carriage assembly 608. For example, as the print carriage assembly 608 moves from right to left (as shown in FIG. 6), the cable 606 would be bent in a loop. As the print carriage assembly 608 continues to move, the cable 606 would be accommodated over the guiding apparatus 602.

Returning to the features of the guiding apparatus 602, the portion 612 accommodates the cable 606 as the print carriage assembly 608 moves from the right to the left direction. The portion 612 is adapted to extend away from an axis along which the print carriage assembly 608 moves. It should be noted that in the present description any reference to the guiding apparatus 602 extending away from the print carriage assembly 608 refers to the guiding apparatus 602 extending away from the axis along which the print carriage assembly 608 moves. In another example, the guiding apparatus 602 may be curved such that the portion 612 may gradually extend away from the print carriage assembly 608.

The guiding apparatus 602 which extends away from the print carriage assembly 608 results in lesser bedding stresses when the cable 606 settles over the portion 612. The reduced bending stresses further reduces the reaction forces that may act on the print carriage assembly 608 thereby improving print quality. Furthermore, since the bending stresses on the cable 606 are reduced the operational life of the cable 606 also increases. These and other aspects are further described in conjunction with other figures as well.

Although examples for the present disclosure have been described in language specific to structural features and/or methods, it should be understood that the appended claims are not necessarily limited to the specific features or methods described. Rather, the specific features and methods are disclosed and explained as examples of the present disclosure.

We claim:

1. An apparatus for retaining a flexible flat cable, the apparatus comprising:
    a clamping member for securely retaining the flexible flat cable to the apparatus in a print device;
    a set of guiding elements for aligning the flexible flat cable when securely retained by the clamping member, and wherein the apparatus is adapted such that the flexible flat cable when extending from the apparatus is at an angle in an upward direction with respect to a horizontal plane in which a print carriage assembly of the print device moves; and
    a surface between the guiding elements from which the cable is to extend, wherein the surface is inclined at the angle with respect to the vertical plane such that the flat flexible cable when extending from the apparatus is at the angle in an upward direction with respect to the horizontal plane.

2. The apparatus as claimed in claim 1, wherein the apparatus is adapted such that the apparatus is tilted by the angle with respect to a vertical plane to cause the flexible flat cable to extend from the apparatus is at the angle in the upward direction with respect to the horizontal plane.

3. The apparatus as claimed in claim 1, wherein the apparatus communicatively couples the flexible flat cable with a print carriage assembly of a print device.

4. A print device comprising:
- a print carriage assembly;
- a flexible flat cable having two ends, wherein one end of the flexible flat cable is connected to the print carriage assembly;
- a clamping member for securely retaining the flexible flat cable to a cable guiding apparatus;
- the cable guiding apparatus having a cable accommodating portion connected to the other end of the flexible flat cable, wherein the cable accommodating portion has a prescribed width so as to accommodate the flexible flat cable, wherein the cable accommodating portion is arranged with respect to the flexible flat cable to enable the flexible flat cable to extend from the cable guiding apparatus at an angle in an upward direction with respect to a horizontal plane in which a print carriage assembly of the print device moves.

5. The print device as claimed in claim 4, wherein the cable accommodating portion is one of linear and curved.

6. The print device as claimed in claim 4, wherein the cable guiding apparatus further comprises:
- an extended portion connected to another end of the cable accommodating portion; and
- a subsequent portion connected to the extended portion such that the extended portion and the subsequent portion provide a concave surface for accommodating the flexible flat cable.

7. The print device as claimed in claim 4, further comprising:
- a power supply module;
- a main circuit board; and
- an interface provided on the cable guiding apparatus, wherein the interface is to communicatively connect the print carriage assembly to the power supply and the main circuit board of the print device.

8. The print device as claimed in claim 4, further comprising a retaining apparatus provided at a junction between the flexible flat cable and the cable guiding apparatus and comprising the clamping member, the retaining apparatus comprising:
- a cavity for aligning the flexible flat cable when securely retained by the clamping member, and with the retaining apparatus so adapted such that the flexible flat cable when extending from the retaining apparatus is at a specific angle in an upward direction with respect to horizontal plane.

9. A print device comprising a flexible flat cable, the print device comprising:
- a print carriage assembly;
- a retaining apparatus comprising a clamping member to retain the flexible flat cable to the retaining apparatus;
- guiding elements to align the flexible flat cable with the clamping member,
- wherein the retaining apparatus is arranged with respect to the flexible flat cable such that the flexible flat cable is to extend from the retaining apparatus at an angle in an upward direction with respect to a horizontal plane responsive to movement of the print carriage assembly; and
- a cable accommodating portion angled with respect to the guiding apparatus, the cable accommodating portion comprising a first portion and a second portion angled with respect to the first portion.

10. The print device of claim 9, further comprising:
a circuit board connected to the guiding apparatus.

11. The print device of claim 9, wherein an angle between the cable accommodating portion and the guiding apparatus is in a range of about 5° to 10°.

12. The print device of claim 9, wherein the first portion and the second portion of the cable accommodating portion forms an inward surface for accommodating the flexible flat cable.

13. The print device of claim 9, wherein the accommodating portion and the first portion are profiled to form a curve.

* * * * *